United States Patent Office 3,232,126
Patented Feb. 1, 1966

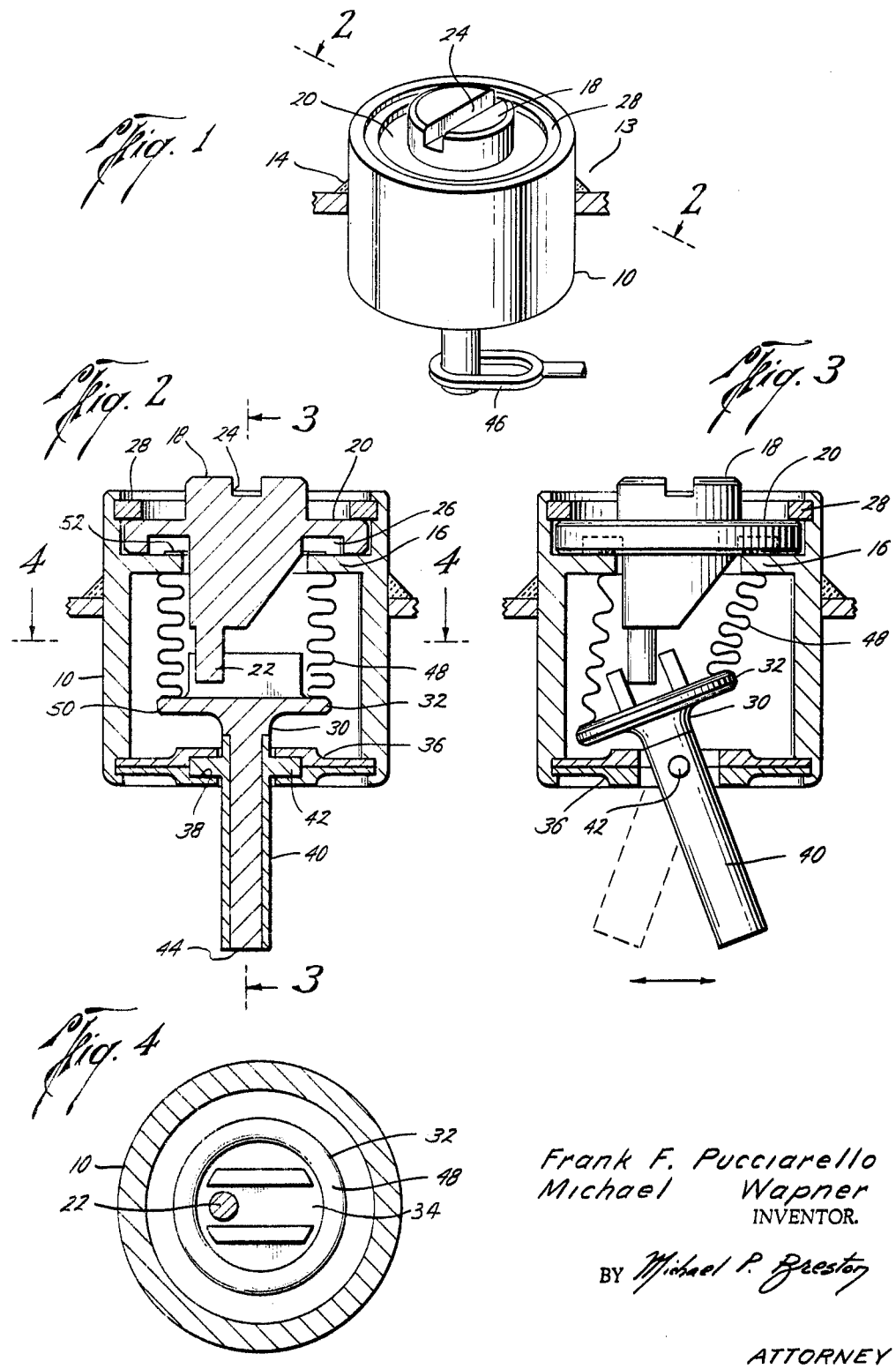

3,232,126
ROTARY-TO-LINEAR TRANSLATING
MECHANISM
Frank Frank Pucciarello, Newark, and Michael Wapner, Cranford, N.J., assignors to Weston Instruments, Inc., a corporation of Texas
Filed Apr. 6, 1964, Ser. No. 357,675
3 Claims. (Cl. 74—18.1)

This invention relates to motion transmitting devices and more particularly to such devices used for translating rotational motion from an external source into linear motion in a hermetically sealed instrument casing.

In many applications, it is desirable that instrument mechanisms be hermetically sealed within their enclosing housings. Sealed in instruments find great application when the measurements to be made are carried out in an environment where the surrounding atmosphere is laden with water vapor, injurious chemicals, gases, or dust. Sealed in instruments also find application when their sensitive movements are subjected to changes in ambient pressure.

It is an object of this invention to provide an improved motion transmitting and translating device which is more efficient and reliable than prior art devices of similar nature.

Another object of this invention is to provide a new and improved motion translating device especially adaptable to act as a zero corrector for measuring instruments in which the movable element of the corrector is hermetically sealed by a bellows unit which permits motion to be transmitted to the movable element from the outside of the instrument's housing without breaking the hermetic seal between the interior of the housing and the surrounding atmosphere.

A further object of this invention is to provide a sealed zero corrector in which the movable element moves along a linear path thereby minimizing the necessary space for the zero corrector.

Yet another object of this invention is to provide a new and improved zero corrector device of the type employing bellows to seal off the movable element from the atmosphere surrounding the outer housing of the instrument wherein the load on the bellows is at a minimum.

The foregoing and other objects and advantages of this invention will become apparent from the following detailed description when taken in conjunction with the accompanying drawings which illustrate a preferred form of construction. In the drawings:

FIGURE 1 is a perspective view of a motion transmitter embodying the invention, as well as of a portion of the instrument mechanism, the position of which it is desired to adjust from the outside of the casing;

FIGURE 2 is essentially a vertical, sectional view on line 2—2 of FIGURE 1;

FIGURE 3 is a partly sectional view on line 3—3 of FIGURE 2; and

FIGURE 4 is a top view on line 4—4 of FIGURE 3.

Referring now to the drawings, the motion transmitter or zero corrector device is contained in a tubular housing 10 which is adapted to be hermetically sealed to a wall 13 of the instrument casing by any suitable means such as a ring of solder 14. Near the upper end of the cylindrical housing 10 is provided an annular shoulder 16 forming an integral part with the housing 10. A crank 18 having a cup-shaped extension 20 and an off-center nipple 22 is provided for receiving a screw driver or other adjusting tool in a slot 24 at the top thereof. A space 26 is defined between the extension 20 and shoulder 16. A retaining ring 28 bears against the crank 18 so that the crank may freely rotate on shoulder 16.

A stud 30 is provided which has a head 32 defining a grooved channel 34 for receiving the nipple 22. The stud 30 is pivotally mounted by two pivot discs 36 defining an opening 38 for receiving an insulated sleeve 40 covering the straight portion of stud 30. Sleeve 40 has at the top thereof a pin 42 housed in the opening 38. The lower end 44 of stud 30 is used to operatively engage a spring abutment 46 of an instrument movement, as is well known. The end 44 is sealed off from the outer atmosphere by a suitable flexible member such as a bellows 48, the lower end of which is soldered to the head 32 by solder 50. The other end of the bellows 48 is soldered to the top surface of shoulder 16 by solder 52.

The operation of the motion transmitter or zero adjustor of this invention should now be apparent. Rotation of the crank 18 makes the off center nipple 22 rotate in the channel 24, thereby causing the end 44 of stud 30 to pivot in a plane perpendicular to the axis of the pin 42 as shown by the arrow 54. It will be appreciated that in accordance with this invention, the stud 30 assumes a linear motion in response to a circular motion imposed on the crank 18 by a screw driver or other suitable tool. As shown in FIGURE 3, the bellows 48 flex from side to side without impairing the solder seals. The motion of the pivoted stud 30 is transmitted to the spring abutment 46 of the instrument mechanism. When the stud 30 becomes linearly displaced in the direction 54, the abutment spring 46 is displaced therewith.

It is realized that other constructions have been proposed for a bellows type zero corrector for sealed electrical instrument casings, but the zero corrector according to this invention is characterized by comparatively few parts which may be readily assembled and mounted upon the top wall of the instrument casing for translating rotational motion into linear motion, thereby minimizing the space generated by the displacement of the pivoted stud 30. Consequently, the instrument housing can be made to include more parts than was heretofore possible.

It will be understood that the principles underlying the invention may be applied to various types of electrical measuring instruments and also that various changes in the construction and arrangement of parts of the illustrated embodiment may be made, without departing from the spirit and scope of the invention as defined in the appended claims.

What is claimed is:

1. A mechanism for translating rotary motion into linear motion in a sealed instrument casing comprising in combination: a housing positioned in a sealed relation to a wall of said casing, a device internally located in said casing; a pivoted stud, one end of said stud projecting through said housing for operatively engaging said internally located device, said stud being pivotally mounted by pin means at its intermediate portion onto one end of said housing, the other end of said stud having a laterally extending head defining a slot therein; a rotatable crank member having a projecting pin at one end thereof; said pin being laterally displaced from the longitudinal axis of said crank member and being freely movable in said slot; means rotatably mounting the other end of said crank member onto the other end of said housing; a flexible tubular member hermetically sealed to said last mentioned means and to said laterally extending head, said tubular member surrounding said crank member; and said one end of said stud becoming laterally displaced in a single plane when said crank member is rotated thereby operating said internally located device.

2. A mechanism for translating rotary motion into linear motion in a sealed instrument casing comprising in combination:

a housing positioned in a sealed relation to a wall of said casing, a device internally located in said casing, a pivoted stud, one end of said stud projecting through said housing for operatively engaging said internally located device, pivotal mounting means secured to one end of said housing for pivotally mounting said stud, said stud having pin means in said mounting means, the other end of said stud having a laterally extending head defining a slot therein; a rotatable crank member having a projecting pin at one end thereof, said pin being laterally displaced from the longitudinal axis of said crank member, said pin slidably engaging the walls of said slot; supporting means for rotatably supporting the other end of said crank member on the other end of said housing; a flexible tubular member hermetically sealed to said supporting means and to said laterally extending head and surrounding said crank member, said one end of said stud becoming laterally displaced in a single plane when said crank member is rotated.

3. A mechanism for translating rotary motion into linear motion in a sealed instrument casing comprising in combination:

a housing positioned in a sealed relation to a wall of said casing, a spring abutment internally located in said casing, a pivoted stud, one end of said stud projecting through said housing for operatively engaging said spring abutment, pivotal mounting means secured to one end of said housing for pivotally mounting said stud, said stud having pin means in said mounting means, the other end of said stud having a laterally extending head defining a slot therein; a rotatable crank member having a projecting pin at one end thereof, said pin being laterally displaced from the longitudinal axis of said crank member, said pin slidably engaging the walls of said slot; supporting means for rotatably supporting the other end of said crank member on the other end of said housing; a flexible bellows hermetically sealed to said supporting means and to said laterally extending head and surrounding said crank member, said one end of said stud becoming laterally displaced in a single plane when said crank member is rotated.

References Cited by the Examiner
UNITED STATES PATENTS 2,454,340 11/1948 Reichel _____ 74—18.1
2,941,407 6/1960 Huber et al. _____ 74—18.1

MILTON KAUFMAN, *Primary Examiner.*